(12) United States Patent
Van Valen, III

(10) Patent No.: US 8,661,347 B2
(45) Date of Patent: *Feb. 25, 2014

(54) USER INTERFACE SYSTEM FOR HANDHELD DEVICES

(75) Inventor: Joseph R. Van Valen, III, Sunnyvale, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,703

(22) Filed: Sep. 14, 2012

(65) Prior Publication Data

US 2013/0007600 A1 Jan. 3, 2013

Related U.S. Application Data

(63) Continuation of application No. 11/303,289, filed on Dec. 16, 2005, now Pat. No. 8,327,297.

(51) Int. Cl.
*G06F 3/00* (2006.01)

(52) U.S. Cl.
USPC .......................................... 715/739; 715/864

(58) Field of Classification Search
USPC ................................................. 715/864, 739
See application file for complete search history.

(56) References Cited

U.S. PATENT DOCUMENTS

| | | |
|---|---|---|
| 6,208,995 B1 | 3/2001 | Himmel et al. |
| 6,784,900 B1 | 8/2004 | Dobronsky et al. |
| 6,868,525 B1 | 3/2005 | Szabo |
| 6,959,339 B1 | 10/2005 | Wu et al. |
| 6,973,456 B1 | 12/2005 | Elgart |
| 7,031,961 B2 | 4/2006 | Pitkow et al. |
| 7,065,520 B2 | 6/2006 | Langford |
| 7,073,121 B2 | 7/2006 | Brown et al. |
| 7,181,438 B1 | 2/2007 | Szabo |
| 7,321,918 B2 | 1/2008 | Burd et al. |
| 7,366,996 B2 | 4/2008 | Hoyle |
| 7,373,358 B2 | 5/2008 | Ronnewinkel et al. |
| 7,406,329 B2 * | 7/2008 | Khurana et al. ........... 455/552.1 |
| 7,451,152 B2 | 11/2008 | Kraft et al. |

(Continued)

FOREIGN PATENT DOCUMENTS

| | | |
|---|---|---|
| GB | 2352600 A | 1/2001 |
| WO | WO 2007/0192130 | 2/2007 |

OTHER PUBLICATIONS

Categorizing the Web Bootstraping Personalized Content Management, Rulespace, Apr. 2001, pp. 1-12.

(Continued)

*Primary Examiner* — Ryan Pitaro
(74) *Attorney, Agent, or Firm* — Finnegan, Henderson, Farabow, Garrett & Dunner, LLP

(57) ABSTRACT

One or more handheld devices may be configured to receive and display content. A server may be configured to help the handheld devices display content. For example, by using at least some of the contents of one or more of feeds, the server may generate user interface data, which the handheld devices may use to display user interfaces that are configured to request content associated with the feeds.

22 Claims, 8 Drawing Sheets

(56) References Cited

U.S. PATENT DOCUMENTS

| | | | |
|---|---|---|---|
| 7,581,166 B2* | 8/2009 | Renger et al. | 715/201 |
| 7,596,533 B2 | 9/2009 | Szabo et al. | |
| 7,702,675 B1 | 4/2010 | Khosla et al. | |
| 7,865,511 B2* | 1/2011 | Kahn et al. | 707/758 |
| 8,060,830 B2* | 11/2011 | Kahn et al. | 715/760 |
| 8,065,383 B2* | 11/2011 | Carlson et al. | 709/217 |
| 8,200,775 B2* | 6/2012 | Moore | 709/217 |
| 2003/0184583 A1 | 10/2003 | Lim | |
| 2003/0212904 A1 | 11/2003 | Randle et al. | |
| 2004/0001081 A1* | 1/2004 | Marsh | 345/721 |
| 2004/0003118 A1 | 1/2004 | Brown et al. | |
| 2004/0049514 A1 | 3/2004 | Burkov | |
| 2004/0139100 A1* | 7/2004 | Gottsman | 707/102 |
| 2004/0189695 A1 | 9/2004 | Kurtz et al. | |
| 2004/0267779 A1 | 12/2004 | Carter et al. | |
| 2005/0050472 A1 | 3/2005 | Faseler et al. | |
| 2005/0165615 A1 | 7/2005 | Minar | |
| 2005/0188403 A1 | 8/2005 | Kotzin | |
| 2005/0198056 A1 | 9/2005 | Dumais et al. | |
| 2005/0198125 A1 | 9/2005 | Beck et al. | |
| 2005/0203917 A1 | 9/2005 | Freeberg et al. | |
| 2005/0216825 A1 | 9/2005 | Teague | |
| 2005/0234940 A1 | 10/2005 | Apparao et al. | |
| 2005/0283734 A1 | 12/2005 | Santoro et al. | |
| 2005/0289147 A1* | 12/2005 | Kahn et al. | 707/10 |
| 2005/0289468 A1* | 12/2005 | Kahn et al. | 715/738 |
| 2006/0073812 A1 | 4/2006 | Venkata et al. | |
| 2006/0095507 A1 | 5/2006 | Watson | |
| 2006/0155698 A1* | 7/2006 | Vayssiere | 707/6 |
| 2006/0167860 A1 | 7/2006 | Eliashberg et al. | |
| 2006/0173985 A1 | 8/2006 | Moore | |
| 2006/0184617 A1* | 8/2006 | Nicholas et al. | 709/203 |
| 2006/0230021 A1 | 10/2006 | Diab et al. | |
| 2006/0235885 A1* | 10/2006 | Steele et al. | 707/104.1 |
| 2006/0240856 A1* | 10/2006 | Counts et al. | 455/518 |
| 2006/0242554 A1 | 10/2006 | Gerace et al. | |
| 2006/0259462 A1 | 11/2006 | Timmons | |
| 2006/0265396 A1 | 11/2006 | Raman et al. | |
| 2006/0288011 A1* | 12/2006 | Gandhi et al. | 707/10 |
| 2007/0011665 A1 | 1/2007 | Gandhi et al. | |
| 2007/0016609 A1 | 1/2007 | Kim et al. | |
| 2007/0022419 A1 | 1/2007 | Subbarao et al. | |
| 2007/0033290 A1 | 2/2007 | Valen et al. | |
| 2007/0033516 A1* | 2/2007 | Khosla et al. | 715/501.1 |
| 2007/0033517 A1 | 2/2007 | O'Shaughnessy et al. | |
| 2007/0050446 A1 | 3/2007 | Moore | |
| 2007/0050734 A1 | 3/2007 | Busey | |
| 2007/0083520 A1 | 4/2007 | Shellen et al. | |
| 2007/0094389 A1 | 4/2007 | Nusset et al. | |
| 2007/0100836 A1* | 5/2007 | Eichstaedt et al. | 707/10 |
| 2007/0198943 A1 | 8/2007 | Grason et al. | |
| 2007/0204308 A1* | 8/2007 | Nicholas et al. | 725/86 |
| 2007/0225047 A1* | 9/2007 | Bakos | 455/566 |
| 2008/0059886 A1* | 3/2008 | Grossman | 715/733 |
| 2008/0126476 A1* | 5/2008 | Nicholas et al. | 709/203 |
| 2009/0013266 A1 | 1/2009 | Gandhi et al. | |
| 2009/0019063 A1* | 1/2009 | Gandhi et al. | 707/10 |
| 2009/0144617 A1* | 6/2009 | Funes et al. | 715/256 |
| 2010/0198686 A1* | 8/2010 | Guedalia et al. | 705/14.53 |

OTHER PUBLICATIONS

Rome v.0.4 Tutorial, Using Rome to Convert a syndication feed from one type to another, http://java.net/bin/view/Javawsxml/Rome04TutorialFeedConverter, Oct. 13, 2005, pp. 1-2.

Home page for Syndic8.com, http://web.archive.org/web/20041112060816, retrieved Jan. 4, 2007, pp. 1-3.

A better PDAnews aggregator, http://blogs.officezealot.com/marc/archive/2004/01/03/2156.aspx, retrieved Jan. 4, 2007, pp. 1-2.

Internet Archive, Frequently Asked Questions, http://www.archive.org/about/faqs.php, retrieved Dec. 6, 2006, pp. 1-46.

Java.net, The Source for Java Technology Collaboration, https://rome.dev.java.net, retrieved Jan. 17. 2006, pp. 1-2.

Using AdvantGo Mobile Inspection 2.0, retrieved Dec. 15, 2005, pp. 1-16.

AdvantGo User Guides, retrieved Dec. 15, 2005, p. 1.

Database Reference Guide for AvantGo Mobile Inspection 2.0, retrieved Dec. 15, 2005, pp. 1-42.

Inspector Training Setup Guide, retrieved Dec. 15, 2005, pp. 1-13.

Installation and Setup Guide for AvantGo Mobile Inspection, retrieved Dec. 15, 2005, pp, 1-46.

AvantGo version 3.x Palm User Guide, retrieved Dec. 15, 2005, pp. 1-91.

AvantGo version 3.x Pocket PC User Guide, retrieved Dec. 15, 2005, pp. 1-79.

AvantGo version 5.7+ Palm User Guide. retrieved Dec. 15. 2005, pp. 1-60.

AvantGo version 5.7+ Pocket PC User Guide, retrieved Dec. 15, 2005, pp. 1-64.

Mobilerss.net, http://www.mobilerss.net, retrieved Dec. 15, 2005, pp. 1-2.

Mobilerss.net, about, http://www.mobilerss.net/about.php, retrieved Dec. 15, 2005, p. 1.

TwoPeaks Releases Free MobileRss Beta, http://www.pocketpcthoughts.com/forums/viewtopic.php?p=156370, retrieved Oct. 25, 2005, pp. 1-5.

Introduction to RSS, http://www.webreference.com/authoring/languages/xml/rss/intro, retrieved Oct. 25, 2005, pp. 1-3.

RSS Syndication and Aggregation, http://www.webreference.com/authoring/languages/xml/rss/intro/2.html, retrieved Oct. 25, 2005, pp. 1-3.

WebRef and the Future of RSS, http://www.webreference.com/authoring/languages/xml/rss/intro/3.html, retrieved Oct. 25, 2005, pp. 1-3.

RSS, http://www.webopedia.com/TERM/R/RSS.html, retrieved Oct. 26, 2005, pp. 1-3.

RDF, http://www.webopedia.com/TERM/R/RDF.html, retrieved Oct. 26, 2005, pp. 1-2.

What is RSS?, http://www.xml.com/ipt/a/2002/12/18/dive-into-xml.html, retrieved Oct. 26, 2005, pp. 1-8.

* cited by examiner

Feed Set Data 32

Table 36 USER

| User ID | User Name |
|---|---|
| 1000 | John |
| 1001 | Mary |

Table 38 USER_SET

| User ID | Set ID |
|---|---|
| 1000 | 2000 |
| 1000 | 2001 |
| 1001 | 2002 |
| 1001 | 2003 |

Table 40 SET

| Set ID | Set Name |
|---|---|
| 2000 | My News |
| 2001 | Sports Stuff |
| 2002 | Mary's Sports |
| 2003 | Mary's News |

Table 42 SET_FEED

| Set ID | Feed ID |
|---|---|
| 2000 | 3001 |
| 2000 | 3002 |
| 2001 | 3003 |
| 2002 | 3003 |
| 2002 | 3005 |
| 2003 | 3004 |

Table 44 FEED

| Feed ID | Feed Name | Feed Location Data |
|---|---|---|
| 3001 | CNN.com | http://cnn.com/rss.xml |
| 3002 | ABC.com | http://abc.go.com/headlines.xml |
| 3003 | ESPN.com | http://espn.go.com/headlines.xml |
| 3004 | CBS.com | rss.cbs.com |
| 3005 | CNNSI.com | rss.sportsillustrated.cnn.com |
| 3006 | SportsLine.com | http://SportsLine.com/rss.dat |

Table 46 FEED_CATEGORY

| Feed ID | Category ID |
|---|---|
| 3001 | 4000 |
| 3002 | 4000 |
| 3003 | 4001 |
| 3004 | 4000 |
| 3005 | 4001 |
| 3006 | 4001 |

Table 48 CATEGORY

| Category ID | Category Name |
|---|---|
| 4000 | News |
| 4001 | Sports |
| 4002 | Politics |

FIGURE 2

USER INTERFACE SYSTEM FOR HANDHELD DEVICES

CROSS-REFERENCE TO RELATED APPLICATIONS

This application is a continuation of U.S. patent application Ser. No. 11/303,289, filed Dec. 16, 2005 now U.S. Pat. No. 8,327,297, the disclosure of which is expressly incorporated herein by reference in its entirety.

BACKGROUND

1. Field of the Invention

The present invention generally relates to user interfaces and, in particular, to user interfaces for handheld devices.

2. Background Technology

Many companies earn a substantial amount of revenue from displaying advertisements on the web pages of their websites. Often, this advertising revenue is directly or indirectly linked to how many times these advertisements are viewed or clicked. For these companies, bringing visitors to their websites is crucial.

To help bring visitors to its website, a company may create a feed that includes headlines with associated links that point to web pages of the company's website. A feed reader may be configured to download the feed and then display headlines and links from the feed. Upon selection of a particular link from a feed, the feed reader may trigger the downloading and display of a web page associated with link. RSS—which is short for "RDF Site Summary," "Rich Site Summary" or "Really Simple Syndication"—is one exemplary format for a feed. Another exemplary format for a feed is Atom.

One typical feed reader includes categories into which one or more feeds may be added. To browse to a feed, a category is first selected from a list of categories and, in response, the feeds in the category are listed. Second, an individual feed within the category is selected and, in response, the individual feed is downloaded and its headlines and links are displayed for selection. To browse to another feed, the feed reader first browses back to the list of the feeds in the current category. If the desired feed is within the current category, the desired feed is selected and, in response, the desired feed is downloaded and its headlines and links are displayed for selection. If the desired feed is not within the current category, the feed reader browses back to the list of categories and the process starts over.

Unfortunately, such browsing can be tedious and time consuming, especially when using a handheld device. Further, many handheld devices have relatively smaller display screens, which can make displaying the content of the feeds more difficult. As understood by those skilled in the art, handheld devices—such as, personal digital assistants (PDAs), mobile phones, palmtops, and the like—are smaller than conventional desktop and notebook computers, which may advantageously allow such handheld devices to be more conveniently carried.

SUMMARY

A need therefore exists for a user interface system that eliminates or diminishes the disadvantages and problems listed above and/or other disadvantages and problems.

One aspect of an embodiment of the invention is a user interface system that includes one or more handheld devices. The handheld devices are preferably configured receive and display content, such as web content. The user interface system may also include one or more feeds, which may be used to help display content on the handheld devices.

Another aspect is a user interface system that includes a server that may be configured to help to display content on one or more handheld devices. For example, the server may be configured to generate user interface data and send it to the handheld device. The server is preferably configured to generate the user interface data using at least some of the contents of one or more of feeds. The handheld device may receive the user interface data and use it to display a user interface, which may be used to request content for display on the handheld device.

A further aspect is computing device that may be used to configure a server to help to display content on one or more handheld devices. For example, the computing device may be used to configure the server to generate user interface data and send it to the handheld device. Preferably, the computing device may configure the server to generate the user interface data using at least some of the contents of one or more of feeds. In contrast to some handheld devices, some computing devices may advantageously have relatively easier-to-see display devices and/or relatively easier-to-use input devices. Accordingly, such computing devices advantageously may make it easier for a person to configure the server to help display content on those handheld devices.

Yet another aspect is a server that may be configured to generate user interface data using some or all of the feed entries of a plurality of feeds. For example, the server may be configured to obtain at least one feed entry from each of a plurality of feeds and generate a user interface file configured to display headlines, links and/or other data at least partially derived from those obtained feed entries. Accordingly, a person need not tediously navigate to and from individual user interfaces for each individual feed in order to view headlines, links and/or other data associated with those individual feeds. Rather, the generated user interface file may be used to display a single user interface displaying headlines, links and/or other data associated with a plurality of feeds. Advantageously, displaying headlines, links and/or other data associated with a plurality of feeds in a single user interface may reduce the time a person may spend browsing the feeds—and thus reduce any charges associated with that browsing. Additionally, displaying headlines, links and/or other data associated with a plurality of feeds in a single user interface may advantageously help avoid any wear and tear that may be associated with requesting, receiving and displaying an individual user interface for each individual feed. It will be understood, however, one may view individual user interfaces for individual feeds, if desired.

Still another aspect is a server that may be configured to generate user interface data using modified content of one or more feeds. For example, the server may be configured to generate a user interface file that is configured to display headlines, links and/or other data derived from a feed without formatting, images and/or other content from the feed. Also, for example, the server may be configured to generate a user interface file that is configured to display a modified headline from a feed entry. Advantageously, the modified content from a feed may be more quickly sent to a handheld device and more quickly displayed by the handheld device—helping to reduce the time a person may spend browsing a feed and thus avoid any associated costs or any associated wear and tear. Also, the modified content from a feed may advantageously be reformatted for a more readable display on a display device of the handheld device.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described. Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limits its scope. The invention will be described and explained with additional specificity and detail through the use of the accompanying drawings in which:

FIG. 2 is a block diagram illustrating an exemplary embodiment of feed data that may be used in the user interface system of FIG. 1;

DETAILED DESCRIPTION

The present invention is generally directed towards a user interface system for handheld devices. The principles of the present invention, however, are not limited to user interface systems for handheld devices. It will be understood that, in light of the present disclosure, the user interface systems disclosed herein can be successfully used in connection with user interfaces for other types of computing devices. A detailed description of the user interface system now follows.

Exemplary Handheld Devices

Figure 1:
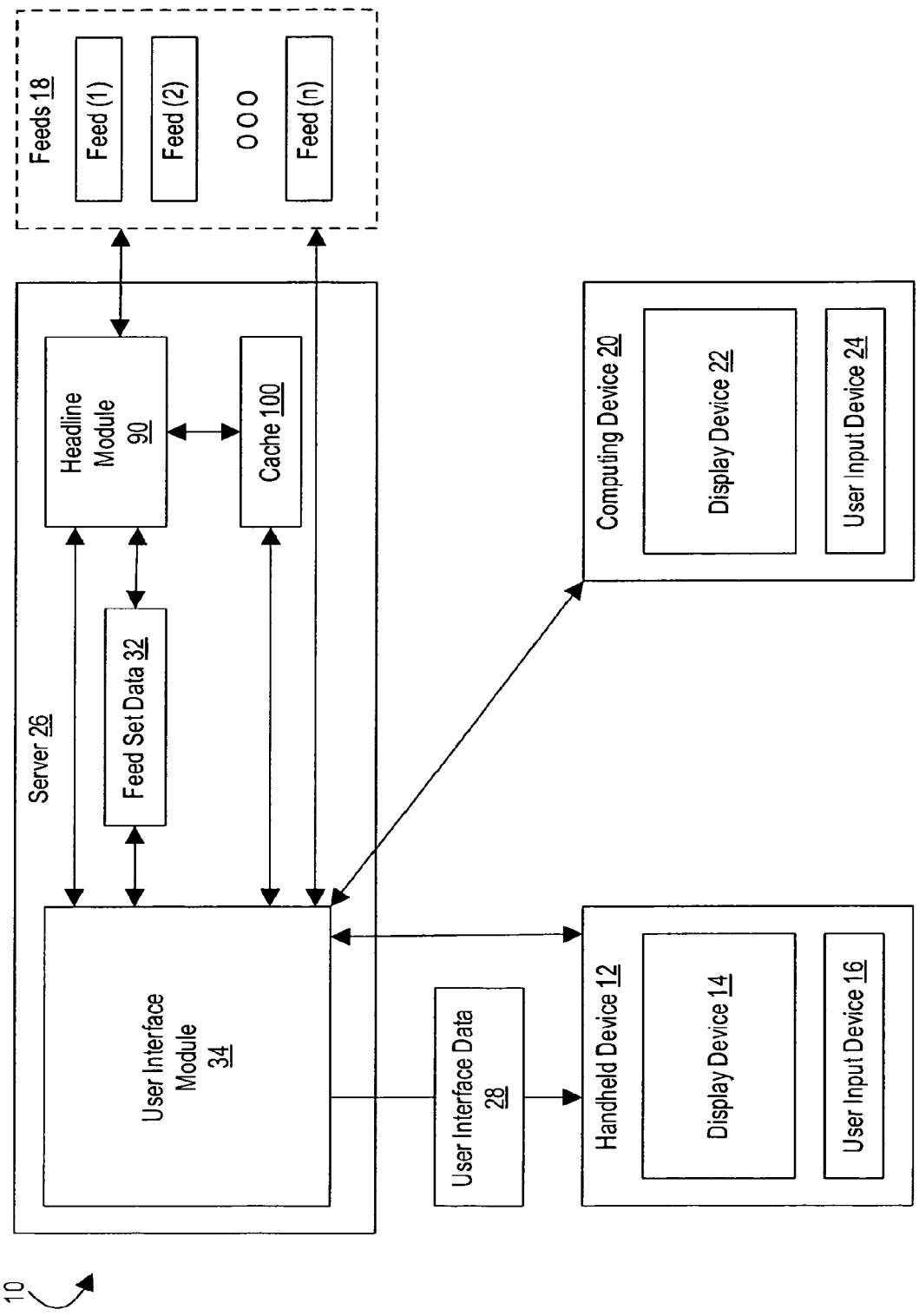
FIG. 1 is block diagram illustrating an exemplary embodiment of a user interface system.

As shown in FIG. 1, a user interface system 10 may include one or more handheld devices 12—such as, personal digital assistants (PDAs), mobile phones, palmtops, and the like. The handheld device 12 may be configured to communicate wirelessly via a wireless communication connection; and the handheld device 12 may also be configured to communicate via a wired communication connection. Thus, the handheld device 12 preferably sends data, requests data, and/or receives data via one or more wired communication connections, one or more wireless communication connections, and/or any combination of one or more thereof. The handheld device 12 also preferably sends, requests, and/or receives web content. In particular, the handheld device 12 may be configured to send, request, and/or receive web content of one or more formats, such as WML, HTML, XML, other formats, or any combination of one or more thereof.

As shown in FIG. 1, the handheld device 12 may include one or more display devices 14, such as monitors, touch-sensitive screens, and the like. The display device 14 is preferably configured to provide a visual output of the handheld device 12. The handheld device 12 may also include one or more user input devices 16, such as keypads, mouse touch pads, mouse knobs, mouse balls, mouse roller wheels, touch-sensitive screens, or other devices that may be used to receive user input. Accordingly, the display device 14 and/or the user input device 16 of the handheld device 12 may be used to send data, request data, receive data, and/or display data. In addition, the display device 14 and/or the user input device 16 may be used to send, request, receive, and/or display web content of any desired format. It will be understood that a display device and a user input device may be embodied in a single device, such as a touch sensitive screen.

Exemplary Feeds

As shown in FIG. 1, the user interface system 10 may include one or more feeds 18, which may be used to display web content. For example, one or more of the feeds 18 may be used to display web content on the display device 14 of the handheld device 12. Also, for example, one or more of the feeds 18 may be used to display web content using a computing device 20.

Like the handheld device 12, the computing device 20 may include one or more display devices 22, and the feeds 18 may be used to display web content on those display devices 22. The computing device 20 may also include one or more user input devices 24. Accordingly, the display device 22 and/or the user input device 24 of the computing device 20 may be used to send data, request data, receive data, and/or display data. In addition, the display device 22 and/or the user input device 24 of the computing device 20 may be used to send, request, receive, and/or display web content of any desired format. As used herein, "computing device" is a broad term and is used in its ordinary meaning and may include, but is not limited to, devices such as, personal computers, desktop computers, notebook computers, palmtops, a general purpose computer, a special purpose computer, mobile telephones, personal PDAs, Internet terminals, multi-processor systems, handheld computing devices, portable computing devices, microprocessor-based consumer electronics, programmable consumer electronics, network PCs, minicomputers, mainframe computers, computing devices that may generate data, computing devices that may have the need for storing or processing data, and the like.

As shown in FIG. 1, the feeds 18 are preferably embodied on a computer-readable medium and may have any of a variety of formats, such as RSS. RSS—which is short for "RDF Site Summary," "Rich Site Summary" or "Really Simple Syndication"—is one exemplary format for a feed. Various embodiments of RSS include version 0.9 (from Netscape), version 0.91 (from UserLand), version 0.92 (from UserLand), version 0.93 (from UserLand), version 0.94 (from UserLand), version 1.0 (from RSS-DEV Working Group), and version 2.0 (from UserLand); however, other versions and embodiments of RSS may currently exist or be developed in the future. Atom is another exemplary format for a feed, which may also have various versions and embodiments. Of course, formats other than RSS and Atom may be suitable for feeds.

A feed 18 preferably comprises data configured to facilitate publishing of headlines and/or other web content. For example, the feed 18 may comprise one or more feed entries (such as, an <item> in RSS or an <entry> in Atom).

A feed entry may comprise a resource identifier. As used herein, "resource identifier" is a broad term and is used in its ordinary meaning and includes, but is not limited to, a uniform resource locator ("URL"), a relative uniform resource locator ("relative URL" or "RELURL"), a uniform resource identifier ("URI"), a uniform resource name ("URN"), a character string used to identify a resource by location and/or type, a bit string used to identify a resource by location and/or type, data used to identify a resource by location and/or type, an address for a resource on the Internet, an address for a resource on a network, an address in memory, an Internet protocol address ("IP address"), a domain name, a relative address, a path, a relative path, and the like.

A feed entry's resource identifier may be used to request and receive web content. For example, a link (such as, a hypertext link) may comprise at least a portion the resource identifier and/or the link may be generated using the resource identifier. The link may be selected to request and receive web content. A feed entry also preferably comprises headline, and the headline may be used, for example, as the displayed text of the link or as header positioned proximate the link. A feed entry may also include other data, such as a description of the web content at the link, an identifier that preferably uniquely identifies the feed entry, and/or other suitable data.

Exemplary Server

As shown in FIG. 1, the user interface system 10 may include a server 26. The server 26 may be configured to help to display content on the display device 14 of the handheld device 12. For example, the server 26 may be configured to generate user interface data 28, such as a user interface file (for example, a WML document, an HTML document, or other document compatible with the handheld device 12). The server 26 may send the user interface data 28 to the handheld device 12. The handheld device 12 may receive the user interface data 28 and use it to display a user interface on its display device 14. The user input device 16 of the handheld device 12 may be used to manipulate one or more user interface elements from the user interface to request content associated with those user interface elements. Exemplary user interface elements include, but are not limited to, links (such as hypertext links), pull down menus, dialog boxes, check boxes, radio or option buttons, drop-down list boxes, scroll bars, scroll boxes, text boxes, and the like.

The server 26 is preferably configured to generate the user interface data 28 using at least some of the contents of one or more of the feeds 18. In particular, the server 26 may be configured to obtain at least one feed entry from at least one of the feeds 18. The server 26 is also preferably configured to use the obtained feed entries to generate a user interface file that is configured to display headlines, links and/or other data at least partially derived from those obtained feed entries. The server 26 may send the user interface file to the handheld device 12. The handheld device 12 may receive the user interface file and use it to display a user interface on its display device 14. The user input device 16 of the handheld device 12 may then be used to select any link from the user interface to request content associated with those links.

In one embodiment, the server 26 may be configured to generate a user interface file using some or all of the feed entries of a plurality of feeds 18. For example, the server 26 may be configured to obtain at least one feed entry from each of a plurality of feeds 18 and generate a user interface file configured to display headlines, links and/or other data at least partially derived from those obtained feed entries. Accordingly, in this embodiment, a person need not tediously navigate to and from individual user interfaces for each individual feed in order to view headlines, links and/or other data associated with those individual feeds 18. Rather, the handheld device 12 may use the generated user interface file to display a single user interface displaying headlines, links and/or other data associated with a plurality of feeds 18. Advantageously, displaying headlines, links and/or other data associated with a plurality of feeds 18 in a single user interface may reduce the time a person may spend browsing the feeds 18—and thus reduce any charges associated with that browsing. Additionally, displaying headlines, links and/or other data associated with a plurality of feeds 18 in a single user interface may advantageously help the handheld device 12 avoid any wear and tear that may be associated with requesting, receiving and displaying an individual user interface for each individual feed 18. It will be understood, however, that the handheld device 12 may be configured to view individual user interfaces for individual feeds 18 depending, for example, upon the particular configuration of the handheld device 12.

In one embodiment, the server 26 may be configured to generate a user interface file using modified content of one or more feeds 18. For example, the server 26 may be configured to generate a user interface file that is configured to display headlines, links and/or other data derived from a feed 18 without formatting, images and/or other content from the feed 19. Also, for example, the server 26 may be configured to generate a user interface file that is configured to display a link at least partially derived from a feed 18 with a modified headline. Advantageously, the modified content from a feed 18 may be more quickly sent to the handheld device 12 and more quickly displayed by the handheld device 12—helping to reduce the time a person may spend browsing the feed 18 and thus avoid any associated costs or any associated wear and tear. Also, the modified content from a feed 18 may advantageously be reformatted for a more readable display on the display device 14 of the handheld device 12.

Exemplary Methods

Figure 3:
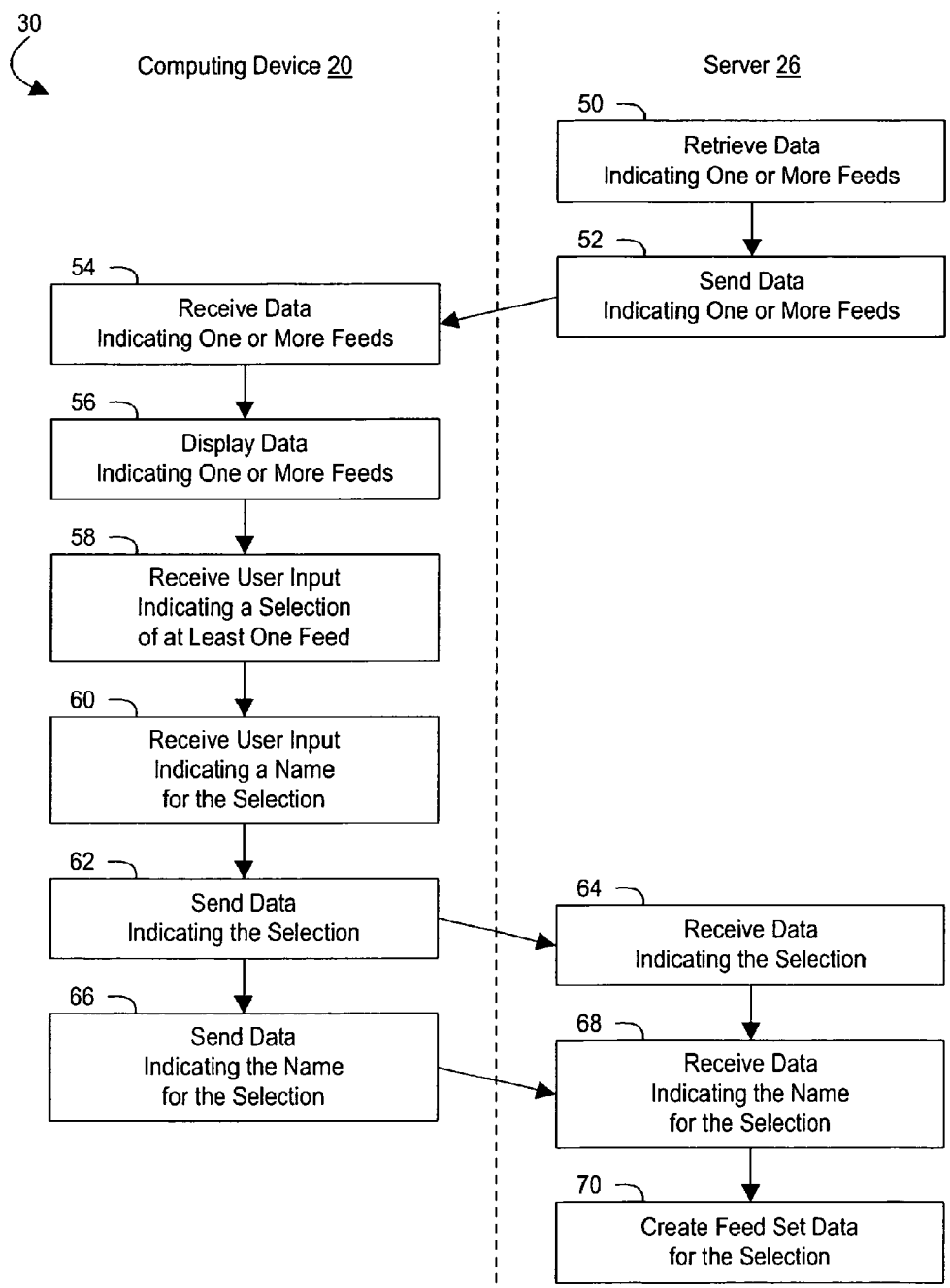
FIG. 3 is a flow chart illustrating an exemplary embodiment of a user interface method.

As shown in FIG. 3, a method 30 may be used to help configure the server 26 to generate the user interface data 28. In particular, as discussed in further detail below, the method 30 may be used to create feed set data 32 (FIGS. 1 and 2), which a user interface module 34 (FIG. 1) of the server 26 may use to generate the user interface data 28. As shown in FIG. 2, exemplary feed set data 32 may be stored in database including one or more tables—such as tables 36, 38, 40, 42, 44, 46, and 48—that may include one or more records. It will be understood, however, that the feed set data 32 does not require the tables 36, 38, 40, 42, 44, 46, and 48 and that the feed set data 32 may comprise other data stored in other suitable data structures.

As shown in FIG. 3, the method 30 may be performed by the computing device 20 and the server 26. However, the method 30 may be performed by the handheld device 12; the computing device 20; the server 26; one or more other suitable modules, systems, and the like; or any combination of one or more thereof. Further, the entire method 30 need not be performed; and any part or parts of the method 30 may be performed to provide a useful method 30.

As shown in FIG. 3, at a block 50, the user interface module 34 of the server 26 may retrieve data indicating one or more feeds, for example, in response to a request from a computing device 20. In one embodiment, at the block 50, the feed set data 32 may comprise the data indicating one or more feeds. For example, the tables 44, 46, and 48 may include various data indicating one or more feeds—such as feed identifiers, feed names, feed location data, and/or other data that may be used indicate one or more feeds. A feed identifier (such as the "Feed ID" field in the table 44) is preferably used to identify a particular feed. A feed name (such as the "Feed Name" field in the table 44) is preferably used for displaying the name of a particular feed. Feed location data (such as the "Feed Location Data" field in the table 44) preferably comprises a resource identifier that identifies a file upon which the feed is embodied and/or a server from which the feed may be obtained.

As shown in FIG. 3, at a block 52, the user interface module 34 of the server 26 may send, to the computing device 20, the data indicating one or more feeds. At a block 54, the computing device 20 may receive the data indicating one or more feeds. At a block 56, the computing device 20 may display at least a portion of the data indicating one or more feeds.

In one embodiment, the computing device 20 may receive the data indicating one or more feeds via a web portal, which may be hosted by the server 26. Accordingly, at the block 52, the server 26 may send the data indicating one or more feeds via a web page, which the computing device 20 receives at the block 54 and displays at the block 56. The web page may, for example, display the feed names from the "Feed Name" field in the table 44 to help facilitate selection of one or more of the feeds at a block 58. It will be understood, however, that neither a web portal nor a web page is required to perform any part of the method.

At the block 58, the computing device 20 may receive user input indicating a selection of at least one feed. For example, the web page displayed at the block 56 may include one or more user interface elements configured to allow a user to select at least one feed. The user interface elements of the web page displayed at the block 56 are preferably configured to allow a user to select a plurality of feeds.

At a block 60, the computing device 20 may receive user input indicating a name for the set of feeds selected at the block 58. For example, the web page displayed at the block 56 may include one or more user interface elements configured to receive a name for the set of feeds selected at the block 58.

At a block 62, the computing device 20 may send, to the server 26, data indicating the feeds selected at the block 58. At block 64, the user interface module 34 of the server 26 may receive the data indicating the selected feeds. For example, the web page displayed at the block 56 may be posted to the server 26.

At a block 66, the computing device 20 may send, to the server 26, data indicating a name for the set of feeds received at the block 60. At block 68, the user interface module 34 of the server 26 may receive the data indicating a name for the set of feeds. For example, the web page displayed at the block 56 may be posted to the server 26.

As shown in FIG. 3, at a block 70, the user interface module 34 of the server 26 may use the data indicating the selected set of feeds (received at the block 64) and also the data indicating a name for the selected set of feeds (received at the block 68) to create at least a portion of the feed set data 30. For example, the user interface module 34 may use the data indicating the selected set of feeds and also the data indicating a name for the selected set of feeds to create data in the tables 36, 38, 40, and 42. In one exemplary scenario, at the block 58 (FIG. 3), a user named John selects a plurality of feeds, in particular, CNN.com and a feed for ABC.com. At the block 60 (FIG. 3), John enters "My News" as a name for the selected set of feeds. Consequently, at the block 70 (FIG. 3), the user interface module 34 creates an record in the table 40 for the "My News" set; creates records in the table 42 associating each selected feed (one record for CNN.com and one record for ABC.com) with the "My News" set; and creates a record in the table 38 associating the "My News" set with John.

Thus, as shown in FIG. 3, the computing device 20 may be used to configure the server 26 to help to display content on the handheld device. In contrast to some handheld devices, some computing devices may advantageously have relatively easier-to-see display devices and/or relatively easier-to-use input devices. Accordingly, the computing device 20 advantageously may make it easier for a person to configure the server 26 to help display content on the handheld device 12. However, the computing device 20; the handheld device 12; one or more other suitable modules, systems, and the like; or any combination of one or more thereof may be used to configure the server 26 to help to display content on the handheld device 12, if desired.

Figure 4:
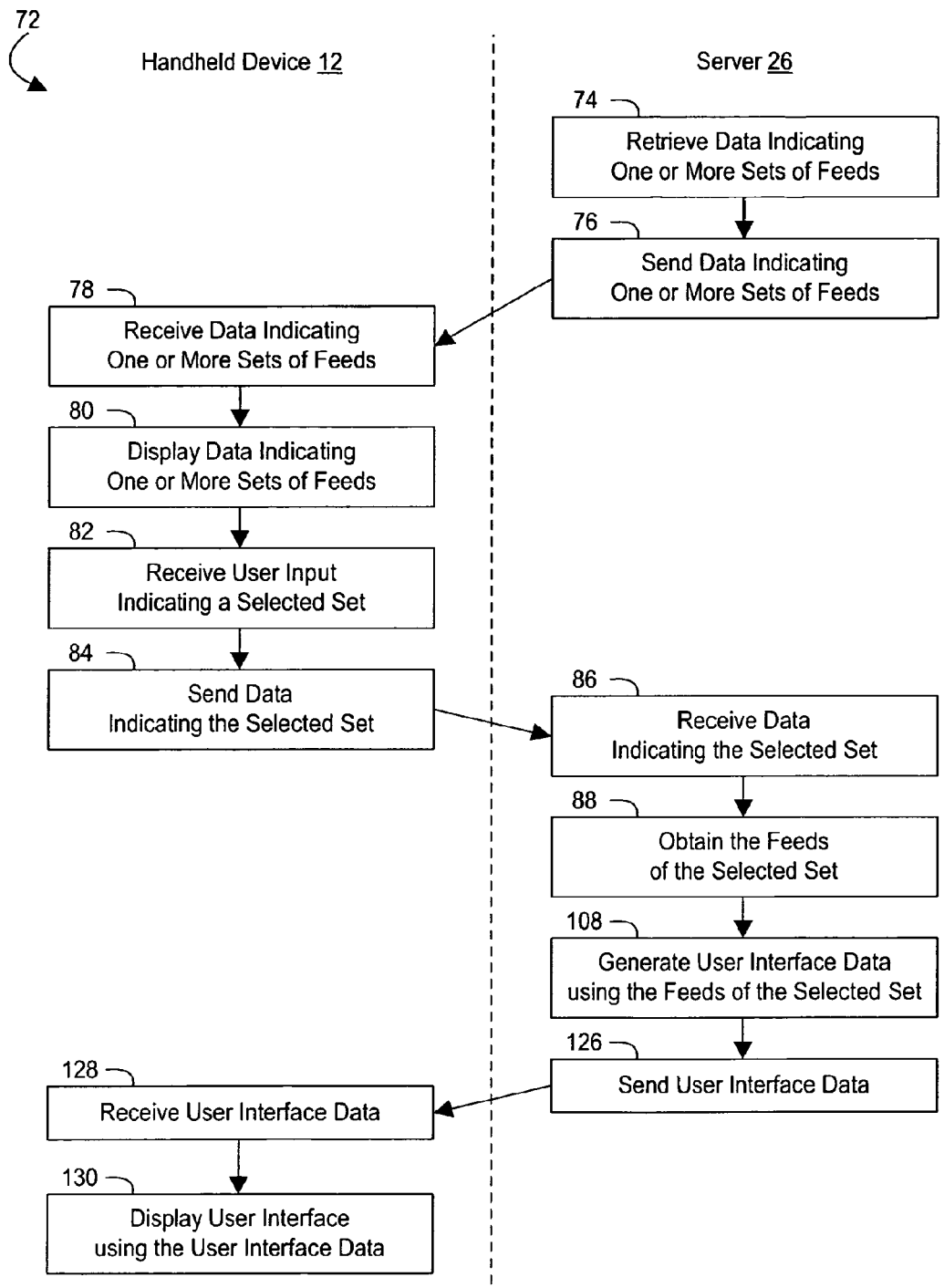
FIG. 4 is a flow chart illustrating an exemplary embodiment of another user interface method.

As shown in FIG. 4, a method 72 may be used to help the handheld device 12 display a user interface. In particular, as discussed in further detail below, the method 72 may be used to generate user interface data 28, which the handheld device 12 may use to display a user interface on its display device 14. As shown in FIG. 4, the method 72 may be performed by the handheld device 12 and the server 26. However, the method 72 may be performed by the handheld device 12; the computing device 20; the server 26; one or more other suitable modules, systems, and the like; or any combination of one or more thereof. Further, the entire method 72 need not be performed; and any part or parts of the method 72 may be performed to provide a useful method 72.

As shown in FIG. 4, at a block 74, the user interface module 34 of the server 26 may retrieve data indicating one or more sets of feeds, for example, in response to a request from the handheld device 12. In one embodiment, at the block 74, the feed set data 30 may comprise the data indicating one or more sets of feeds. For example, the table 40 may include various data indicating one or more sets of feeds—such as set identifiers, set names, and/or other data that may be used indicate one or more sets of feeds. A set identifier (such as the "Set ID" field in the table 40) is preferably used to identify a particular set of feeds. A set name (such as the "Set Name" field in the table 40) is preferably used for displaying the name of a particular set of feeds.

As shown in FIG. 4, at a block 76, the user interface module 34 of the server 26 may send, to the handheld device 12, the data indicating one or more sets of feeds. At a block 78, the handheld device 12 may receive the data indicating one or more sets of feeds. At a block 80, the handheld device 12 may display at least a portion of the data indicating one or more sets of feeds.

As shown in FIG. 4, at the block 82, the handheld device 12 may receive user input indicating a selection of at least one feed. For example, the handheld device 12 may display a user interface including one or more user interface elements configured to allow a user to select at least one feed set. At a block 84, the handheld device 12 may send, to the server 26, data indicating the feed set selected at the block 82. At block 86, the user interface module 34 of the server 26 may receive the data indicating the selected feed set.

At a block 88, the user interface module 34 and/or a headline module 90 (FIG. 1) of the server 26 may obtain the feeds of the selected set. For example, as shown in the exemplary embodiment of FIG. 5, the block 88 (FIG. 4) may itself comprise one or more blocks. At a block 92, the user interface module 34 may use the data indicating the selected feed set (received at the block 86 in FIG. 4) to retrieve data indicating the feeds of the selected set. For example, the user interface module 34 may query the tables 42 and 44 to retrieve feed identifiers, feed names, feed location data and/or other data indicating the feeds of the selected set. At a block 94, the user interface module 34 may send, to the headline server 90, the data indicating the feeds of the selected set. At a block 96, the headline module 90 may receive the data indicating the feeds of the selected set.

Figure 5:
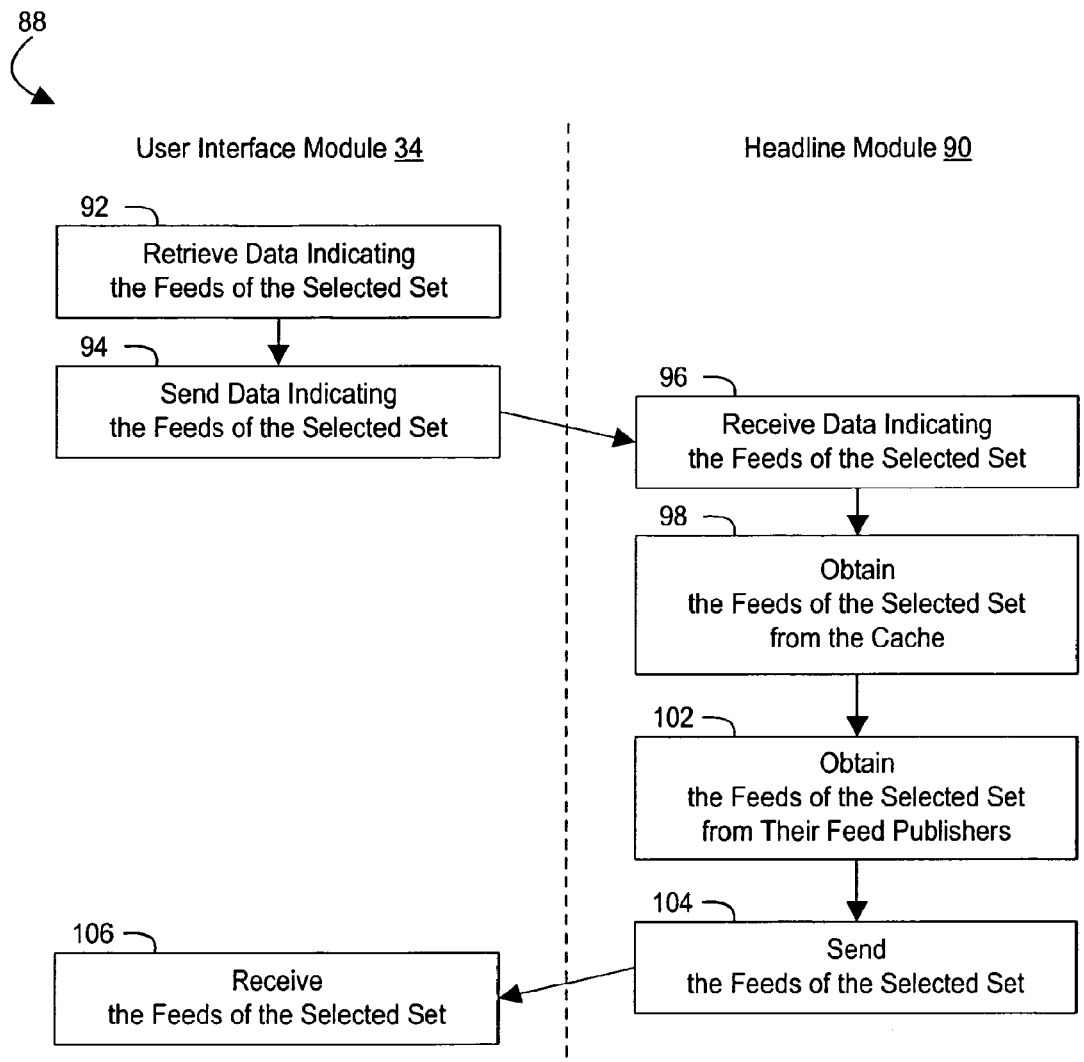
FIG. 5-10 are flow charts illustrating exemplary embodiments of portions of the user interface method shown in FIG. 4.
Figure 6:
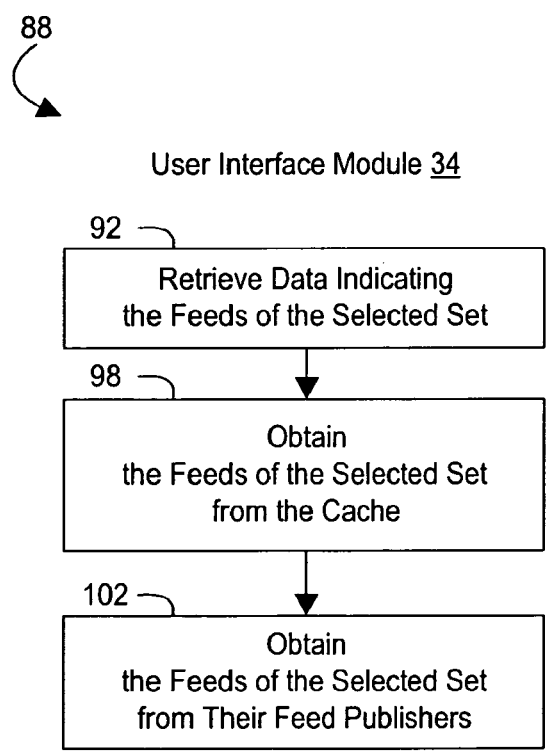

As shown in FIG. 5, at a block 98, the headline module 90 may access a cache 100 (FIG. 1) and use the data indicating the feeds of the selected set (received at the block 96) to obtain any of such feeds that are within the cache 100. The cache 100 may advantageously help provide faster access to feeds that are frequently used. At the block 102, the headline module 90 may use the data indicating the feeds of the selected set (received at the block 96) to obtain the feeds that are not within the cache 100 or that should be updated in the cache 100. In particular, at the block 102, the headline module 90 may obtain the feeds from an associated feed publisher using, for example, a resource identifier like the "Feed Location Data" field from the table 44 (FIG. 2). Upon obtaining the feeds from the feed publisher, the headline module 90 may update the cache 100 with the obtained feeds, if desired. It will be understood, however, that the cache 100 is not required and that the server 26 could obtain the feeds without caching the feeds. It will also be understood that the headline module 90 is not required and that the server 26 could obtain the feeds without the headline module 90. For example, as shown in the exemplary embodiment of FIG. 6, an the block 88 may comprise the blocks 92, 98 and 102, which may be performed by the user interface module 34. Further, it will be understood that the the server 26 could obtain the feeds of the selected set without the user interface module 34 and the headline module 90.

As shown in FIG. 4, at the block 108, the user interface module 34 of the server 36 may generate user interface data 28 (FIG. 1) using at least some of the contents of the feeds obtained at the block 88. In a first example, as shown in the exemplary embodiment of FIG. 7, the block 108 (FIG. 4) may comprise blocks 110 and 112. At the block 110, the user interface module 34 of the server 26 may parse or otherwise analyze the feeds to obtain at least one feed entry from each of a plurality of feeds of the set selected at the block 82 (FIG. 4). At the block 112, the user interface module 34 may generate user interface data 28 comprising a user interface file configured to display headlines, links and/or other data at least partially derived from the feed entries that were obtained at the block 110.

Figure 8:
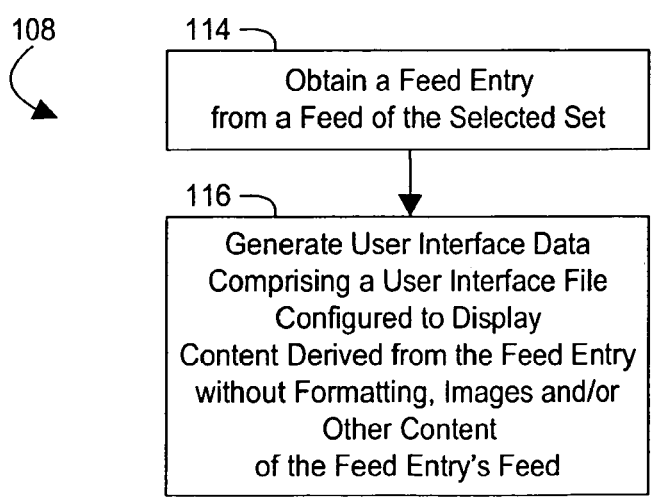

In a second example, as shown in the exemplary embodiment of FIG. 8, the block 108 (FIG. 4) may comprise blocks 114 and 116. At the block 114, the user interface module 34 of the server 26 may parse or otherwise analyze the feeds to obtain at least one feed entry from at least one feed selected at the block 82 (FIG. 4). At the block 116, the user interface module 34 may generate user interface data 28 comprising a user interface file configured to display headlines, links and/or other data at least partially derived from the at least one feed entry obtained at the block 114 without text or font formatting, images and/or other content from the feed entry's feed.

Figure 9:
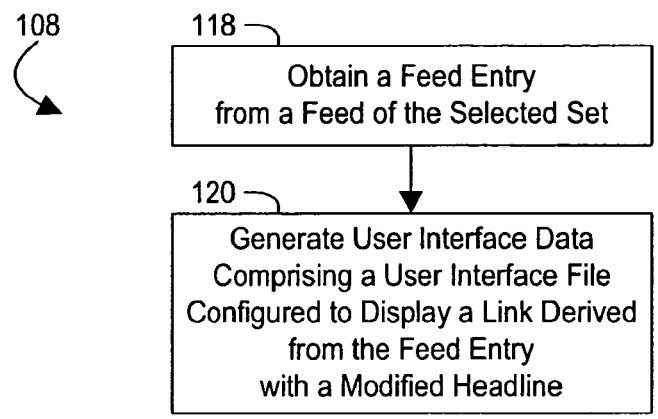

In a third example, as shown in the exemplary embodiment of FIG. 9, the block 108 (FIG. 4) may comprise blocks 118 and 120. At the block 118, the user interface module 34 of the server 26 may parse or otherwise analyze the feeds to obtain at least one feed entry from at least one feed selected at the block 82 (FIG. 4). At the block 120, the user interface module 34 may generate user interface data 28 comprising a user interface file configured to display a modified headline and a link at least partially derived from the at least one feed entry obtained at the block 114. For example, the modified headline may comprise a truncated headline from the feed entry. The modified headline may have added text, such as an ellipsis, that indicates that the headline has been truncated. If desired, the link may include the headline; however, the headline may be disposed proximate the link.

Figure 10:
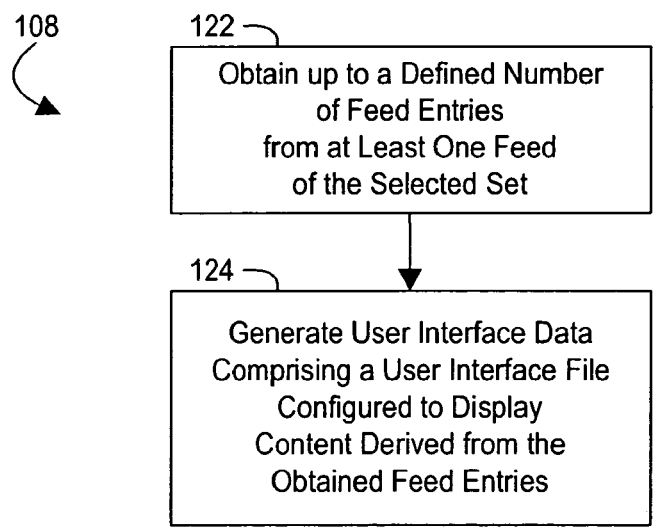

In a fourth example, as shown in the exemplary embodiment of FIG. 10, the block 108 (FIG. 4) may comprise blocks 122 and 124. At the block 122, the user interface module 34 of the server 26 may parse or otherwise analyze the feeds to obtain up to a defined limit of feed entries from at least one feed entry of feeds of the set selected at the block 82 (FIG. 4). For example, in one embodiment, a defined limit of feed entries may be limit of feed entries per feed. Also, in one embodiment, the defined limit of feed entries may be limit of total feed entries for the entire set of feeds. Further, in one embodiment, the defined limit of feed entries may be an average of feed entries per feed. At the block 124, the user interface module 34 may generate user interface data 28 comprising a user interface file configured to display headlines, links and/or other data at least partially derived from the feed entries that were obtained at the block 122. Advantageously, the limited number of feed entries may be used to create user interface data 28 that is more quickly and easily downloaded and/or displayed. In one embodiment, the defined limit may be selected by a user via, for example, the handheld device 12 or the computing device 20.

Figure 7:
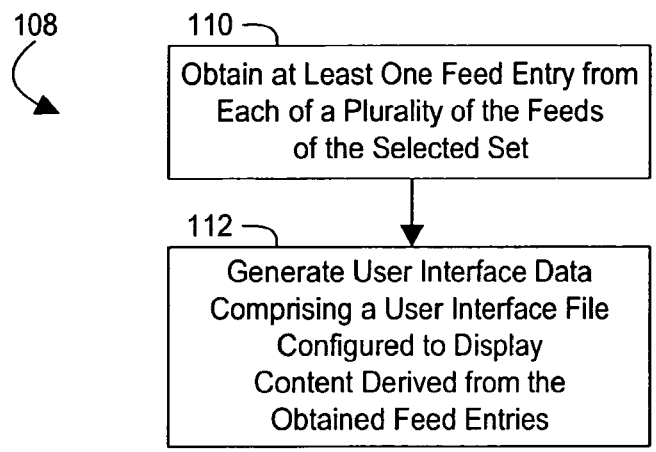

At the block 108, the contents of the feeds (obtained at the block 88) may be used to generate suitable user interface data 28 using one or more aspects of the embodiment shown in FIG. 7; one or more aspects of the embodiment shown in FIG. 8; one or more aspects of the embodiment shown in FIG. 9; one or more aspects of the embodiment shown in FIG. 10; other processes; or any suitable combination of one or more thereof. Thus, it will be understood that the contents of the feeds may be used in a variety of suitable ways (including ways other than those shown in FIGS. 7-10) to generate a variety of other suitable user interface data 28 at the block 108.

As shown in FIG. 4, at the block 126, the user interface module 34 of the server 36 may send the user interface data 28 generated at the block 108 to the handheld device 12. At the block 128, the handheld device 12 may receive the user interface data 28, and at the block 130, may use the user interface data 28 to display a user interface on its display device 14. At the block 130, the user interface module 34 may generate user interface data 28 comprising a user interface file configured to display headlines, links and/or other data at least partially derived from the feeds or feed entries that were obtained at the blocks 88, 108.

Exemplary Environments

The methods and systems described above require no particular component or function. Thus, any described component or function—despite its advantages—is optional. Also, some or all of the described components and functions described above may be used in connection with any number of other suitable components and functions. For example, while the server 26 may include components, such as the feed set data 32, the user interface module 34, the headline module 90 and the cache 100, any combination of these components (and any related functionality) may be embodied as part of the handheld device 12; the computing device 20; the server 26; one or more other suitable modules, systems, and the like; or any combination of one or more thereof.

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

One skilled in the art will also appreciate that although the exemplary embodiments discussed above have been described with respect to handheld devices, these aspects and features may also be used in connection with other types of computing devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing content from a plurality of feeds, comprising:
    a server configured to:
        send data identifying the plurality of feeds to a device of a user for display;
        receive a first set of selections from the user indicating a first set of feeds of the plurality of feeds and a first identifier for the first set of feeds;
        receive a second set of selections from the user indicating a second set of feeds of the plurality of feeds and a second identifier for the second set of feeds;
        store an association between the first identifier and the first set of feeds and store an association between the second identifier and the second set of feeds;
        enable reception, from the user, of a request for content from one of the plurality of feeds, feeds associated with the first identifier, or feeds associated with the second identifier; and
        in response to receiving a request for content from feeds associated with the first identifier:
            obtain content from each feed of the first set of feeds;
            modify the content obtained from each feed of the first set of feeds for display on the device of the user;
            aggregate, into a markup-language document, the modified content; and
            send, to the device of the user, the markup-language document that includes the modified content, the device of the user being configured to render the markup-language document to display the modified content.

2. The system of claim 1, wherein the markup-language document is a hypertext markup language (HTML) document, and further wherein the server is configured to aggregate, into the HTML document, the modified content.

3. The system of claim 1, wherein the markup-language document is a wireless markup language (WML) document, and further wherein the server is configured to aggregate, into the WML document, the modified content.

4. The system of claim 1, wherein the server is configured to aggregate, into the markup-language document, the modified content obtained from each feed of the first set of feeds by:
    using the first identifier to identify each feed of the first set of feeds;
    obtaining content from the identified feeds;
    modifying the content obtained from the identified feeds; and
    aggregating, into the markup-language document, the modified content obtained from the identified feeds.

5. The system of claim 4, wherein the server is configured to obtain content from the identified feeds by analyzing the identified feeds to obtain up to a defined limit of feed entries.

6. The system of claim 1, wherein the server is configured to aggregate, into the markup-language document, the modified content obtained from each feed of the first set of feeds by:
    using the first identifier to identify each feed of the first set of feeds;

obtaining headlines from the identified feeds;
modifying the obtained headlines; and
aggregating, into the markup-language document, the modified headlines obtained from the identified feeds.

7. The system of claim 6, wherein the modified headlines are truncated headlines.

8. A system for providing content from a plurality of feeds, the system comprising:
a handheld device of the user, the handheld device configured to:
display data identifying the plurality of feeds;
send, to the server, a first set of selections indicating a first set of feeds of the plurality of feeds and a first identifier for the first set of feeds;
send, to the server, a second set of selections indicating a second set of feeds of the plurality of feeds and a second identifier for the second set of feeds;
send, to the server, a request for information from feeds associated with the first identifier;
receive, from the server, a markup-language document that includes the information aggregated from the first set of feeds collectively, the information being modified by the server for display on the handheld device; and
render the markup-language document that includes the modified information aggregated from the first set of feeds collectively to display the modified information.

9. The system of claim 8, wherein the markup-language document is a hypertext markup language (HTML) document that includes the modified information aggregated from the first set of feeds.

10. The system of claim 8, wherein the markup-language document is a wireless markup language (WML) document that includes the information aggregated from the first set of feeds.

11. The system of claim 8, wherein the system further comprises the server.

12. The system of claim 11, wherein the server is configured to aggregate, into the markup-language document, the modified content obtained from each feed of the first set of feeds by:
using the first identifier to identify each feed of the first set of feeds;
obtaining content from the identified feeds;
modifying the content obtained from the identified feeds; and
aggregating, into the markup-language document, the modified content obtained from the identified feeds.

13. The system of claim 12, wherein the server is configured to obtain content from the identified feeds by analyzing the identified feeds to obtain up to a defined limit of feed entries.

14. The system of claim 11, wherein the server is configured to aggregate, into the markup-language document, the modified content obtained from each feed of the first set of feeds by:
using the first identifier to identify each feed of the first set of feeds;
obtaining headlines from the identified feeds;
modifying the obtained headlines; and
aggregating, into the markup-language document, the modified headlines obtained from the identified feeds.

15. The system of claim 14, wherein the modified headlines are truncated headlines.

16. A method for providing content from a plurality of feeds, comprising:
sending data identifying the plurality of feeds to a device of a user for display:
receiving a first set of selections from the user indicating a first set of feeds of the plurality of feeds and a first identifier for the first set of feeds;
receiving a second set of selections from the user indicating a second set of feeds of the plurality of feeds and a second identifier for the second set of feeds;
storing an association between the first identifier and the first set of feeds and storing an association between the second identifier and the second set of feeds;
enabling reception, from a device of the user, of a request for content from one of the plurality of feeds, feeds associated with the first identifier, or feeds associated with the second identifier; and
in response to receiving a request for content from the first set of feeds:
obtaining content from each feed of the first set of feeds;
modifying the content obtained from each feed of the first set of feeds for display on the device of the user;
aggregating, into a markup-language document, the modified content; and
sending, to the device of the user, the markup-language document that includes the modified content, the device of the user being configured to render the markup-language document to display the modified content.

17. The method of claim 16, wherein the markup-language document is a hypertext markup language (HTML) document, and further wherein the method comprises aggregating, into the HTML document, the modified content.

18. The method of claim 16, wherein the markup-language document is a wireless markup language (WML) document, and further wherein the method comprises aggregating, into the WML document, the modified content.

19. The method of claim 16, wherein aggregating, into the markup-language document, the modified content further comprises:
using the first identifier to identify each feed of first set of feeds;
obtaining content from the identified feeds;
modifying the content obtained from the identified feeds; and
aggregating, into the markup-language document, the modified content obtained from the identified feeds.

20. The method of claim 19, wherein obtaining content from the identified feeds further comprises analyzing the identified feeds to obtain up to a defined limit of feed entries.

21. The method of claim 16, wherein aggregating, into the markup-language document, the modified content further comprises:
using the first identifier to identify each feed of the first set of feeds;
obtaining headlines from the identified feeds;
modifying the obtained headlines; and
aggregating, into the markup-language document, the modified headlines obtained from the identified feeds.

22. The method of claim 21, wherein the modified headlines are truncated headlines.

* * * * *